United States Patent
Perez et al.

(10) Patent No.: US 9,603,758 B1
(45) Date of Patent: Mar. 28, 2017

(54) IN-FLOOR VEHICLE RAMP

(71) Applicant: VANTAGE MOBILITY INTERNATIONAL, LLC, Phoenix, AZ (US)

(72) Inventors: Michael L. Perez, Tempe, AZ (US); Steven P. Ungetheim, Peoria, AZ (US)

(73) Assignee: Vantage Mobility International, LLC, Phoenix, AZ (US)

(*) Notice: Subject to any disclaimer, the term of this patent is extended or adjusted under 35 U.S.C. 154(b) by 65 days.

(21) Appl. No.: 14/816,278

(22) Filed: Aug. 3, 2015

Related U.S. Application Data

(63) Continuation of application No. 14/483,513, filed on Sep. 11, 2014, now Pat. No. 9,126,522.

(60) Provisional application No. 61/934,235, filed on Jan. 31, 2014, provisional application No. 61/987,339, filed on May 1, 2014.

(51) Int. Cl.
  *B60P 1/43* (2006.01)
  *A61G 3/06* (2006.01)

(52) U.S. Cl.
  CPC .............. *A61G 3/061* (2013.01); *B60P 1/431* (2013.01); *A61G 2220/14* (2013.01); *Y10S 414/134* (2013.01)

(58) Field of Classification Search
  CPC ...... A61G 3/061; B60P 1/431; Y10S 414/134
  See application file for complete search history.

(56) References Cited

U.S. PATENT DOCUMENTS

| | | | | |
|---|---|---|---|---|
| 3,711,882 A * | 1/1973 | Iller | ........................ | A61G 3/061 14/69.5 |
| 3,870,170 A * | 3/1975 | Noble | ..................... | B60P 1/431 14/69.5 |
| 5,305,486 A * | 4/1994 | Smith | ..................... | A61G 3/061 14/69.5 |
| 5,636,399 A * | 6/1997 | Tremblay | ................ | A61G 3/061 14/71.1 |
| 5,676,515 A * | 10/1997 | Haustein | ................. | A61G 3/067 14/69.5 |
| 5,795,125 A * | 8/1998 | Walkden | .................. | B60P 1/431 14/71.1 |
| 5,832,555 A * | 11/1998 | Saucier | ................... | A61G 3/061 14/71.1 |
| 6,186,733 B1 * | 2/2001 | Lewis | ..................... | A61G 3/061 414/537 |

(Continued)

FOREIGN PATENT DOCUMENTS

EP  2260817 A2 * 12/2010 ............. A61G 3/061

*Primary Examiner* — James Keenan
(74) *Attorney, Agent, or Firm* — Fennemore Craig, P.C.

(57) ABSTRACT

A ramp system includes a base frame adapted to be mounted to a vehicle. First and second elongate track members are mounted to the base frame in generally parallel, spaced-apart relation so that they extend along a longitudinal direction. A trolley assembly is moveably mounted to the first and second elongate track members so that the trolley assembly is moveable along the longitudinal direction between retracted and extended positions. A ramp member is pivotally mounted to the trolley assembly. A support roller mounted to the base frame supports a portion of the ramp member. A handle assembly mounted to the ramp member allows a user to move the ramp member between the retracted and extended positions.

19 Claims, 13 Drawing Sheets

(56) References Cited

U.S. PATENT DOCUMENTS

| | | | |
|---|---|---|---|
| 6,264,416 B1* | 7/2001 | Eaton, Jr. | B60P 1/431 14/71.1 |
| 6,343,908 B1* | 2/2002 | Oudsten | A61G 3/061 414/537 |
| 6,860,701 B2* | 3/2005 | Kiser | A61G 3/061 414/522 |
| 7,043,789 B2* | 5/2006 | Morrish | A61G 3/061 14/69.5 |
| 2002/0110444 A1* | 8/2002 | Navarro | B60P 1/431 414/537 |
| 2004/0136820 A1* | 7/2004 | Cohn | B60P 1/433 414/537 |
| 2004/0146385 A1* | 7/2004 | Edwards | B60P 1/431 414/537 |
| 2006/0245883 A1* | 11/2006 | Fontaine | A61G 3/061 414/537 |
| 2012/0279417 A1* | 11/2012 | Charbonneau | B60P 1/43 105/348 |
| 2014/0147237 A1* | 5/2014 | Rasekhi | A61G 3/061 414/537 |

* cited by examiner

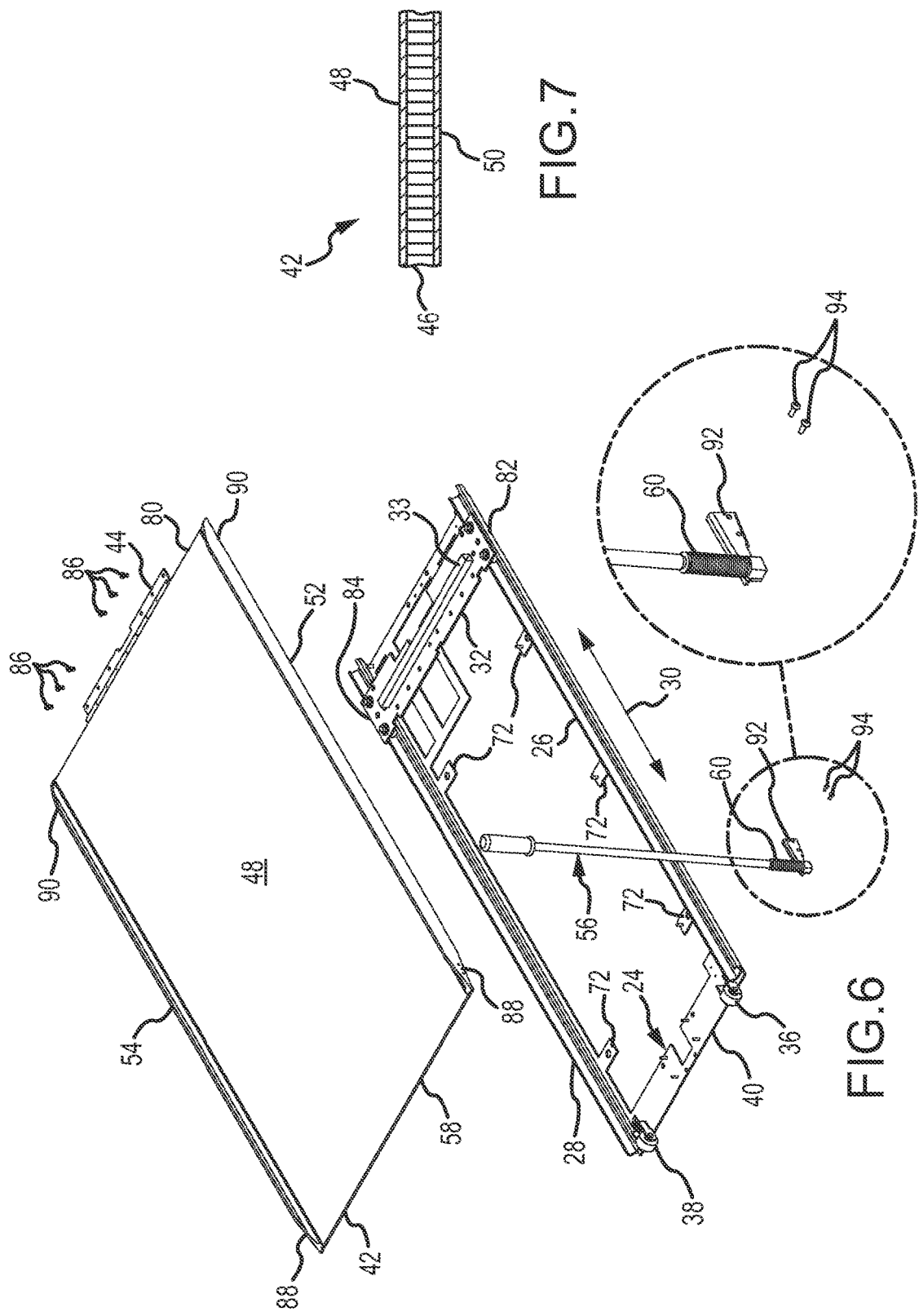

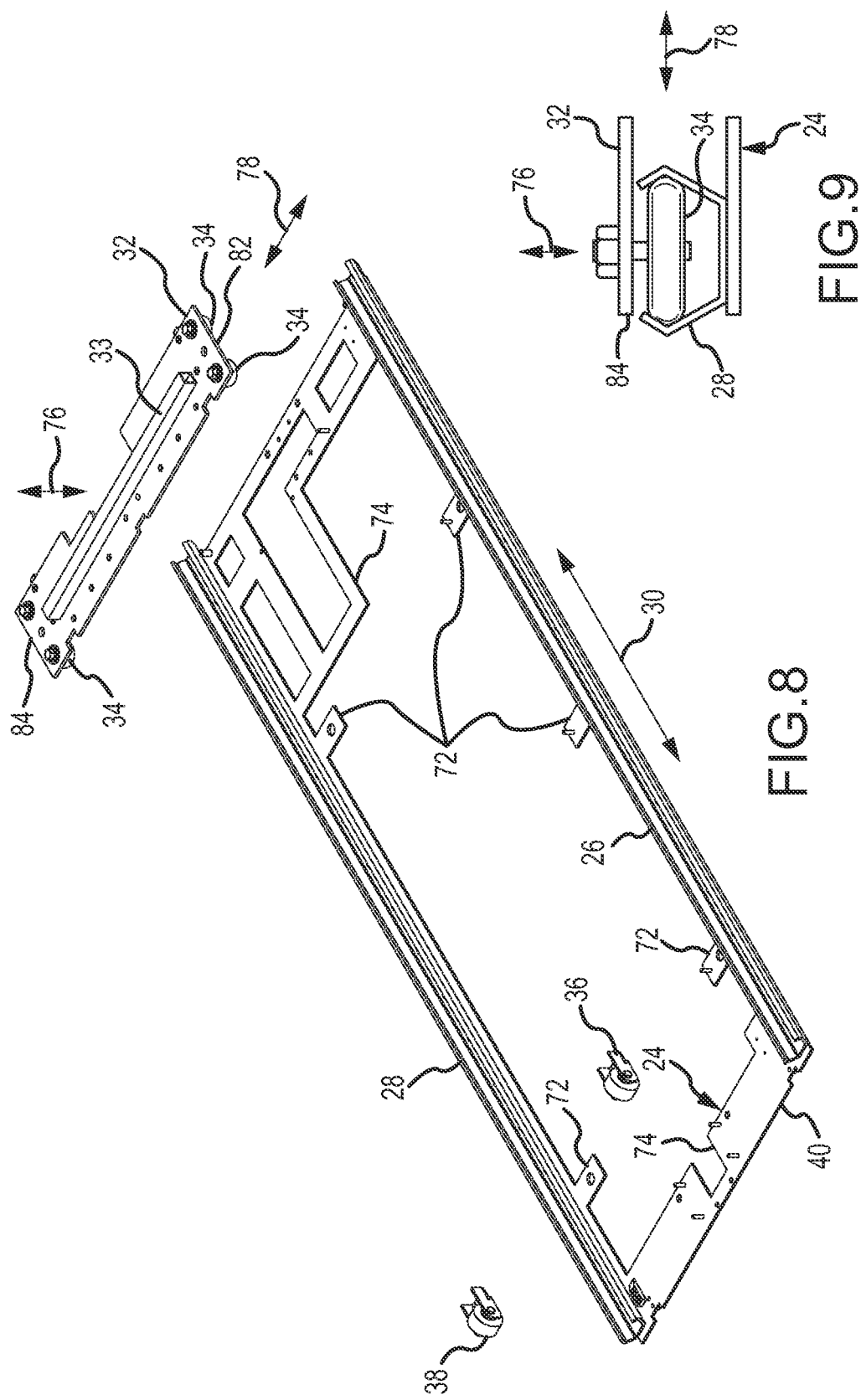

IN-FLOOR VEHICLE RAMP

CROSS-REFERENCE TO RELATED APPLICATIONS

This application is a continuation of U.S. application Ser. No. 14/483,513, filed Sep. 11, 2014, entitled "In-Floor Vehicle Ramp," now U.S. Pat. No. 9,126,522, which claims the benefit of U.S. Provisional Patent Application No. 61/934,235, filed on Jan. 31, 2014, entitled "Manual In Vehicle Floor Ramp" and U.S. Provisional Patent Application No. 61/987,339, filed on May 1, 2014, entitled "In Floor Vehicle Ramp," both of which are hereby incorporated herein by reference for all that they disclose.

TECHNICAL FIELD

This invention relates to wheelchair ramps in general and more specifically to wheelchair ramps for use in motor vehicles.

BACKGROUND

Presently, no major automobile manufacturer mass produces highway vehicles which accommodate wheelchair access for private use. Consequently, these mass-produced, or OEM, vehicles must be modified and converted to properly accommodate wheelchair access. Wheelchair modifications usually require raising the vehicle's body and/or lowering the floor. Ideally, the floor of a converted vehicle is flat to allow for wheelchair access and maneuverability inside the vehicle. OEM vehicles often contain components that limit the space available for flat flooring or modifications. While these components are necessary for the effective and safe operation of a vehicle, this reduces flat floor space and greatly decreases the ability of a user to maneuver a wheelchair within the vehicle.

Ramps are added to the vehicles to allow wheelchairs to travel from the ground or other surface into the vehicle. Some ramps are powered and require a motor, controls, and other hardware, which may be cumbersome and relatively expensive. Furthermore, various portions of the vehicle may have to be moved or modified, such as the frame, axle, muffler, etc.

Other limitations may include the wheelchair having to be lifted into the vehicle generally in a sideways orientation. This would make maneuvering into and within the vehicle very difficult in the small space.

SUMMARY OF THE INVENTION

A ramp system for a vehicle according to one embodiment of the invention may include a base frame adapted to be mounted to the vehicle. First and second elongate track members are mounted to the base frame in generally parallel, spaced-apart relation so that they extend along a longitudinal direction. A trolley assembly is moveably mounted to the first and second elongate track members so that the trolley assembly is moveable along the longitudinal direction between retracted and extended positions. A ramp member is pivotally mounted to the trolley assembly. A support roller mounted to the base frame supports at least a portion of the ramp member. A handle assembly mounted to the ramp member allows a user to move the ramp member between the retracted and extended positions. The cooperative engagement of the ramp member with the trolley assembly and the support roller lowering a leading edge of the ramp member to a ground surface when the ramp is being moved to the extended position. The cooperative engagement also elevating the leading edge of the ramp member from the ground surface when the ramp member is moved toward the retracted position.

BRIEF DESCRIPTION OF THE DRAWINGS

Illustrative and presently preferred exemplary embodiments of the invention are shown in the drawings in which:

FIG. 6 is an exploded view in perspective of a portion of the vehicle ramp system showing the base and ramp members as well as the trolley and handle assemblies;

FIG. 7 is an enlarged sectional view in elevation of a portion of the laminated structure of one embodiment of the ramp member;

FIG. 8 is an exploded view in perspective of the base member and trolley assembly;

FIG. 9 is an enlarged side view in elevation showing the engagement of a guide wheel of the trolley assembly with a C-shaped track member;

DETAILED DESCRIPTION OF THE PREFERRED EMBODIMENTS

Figure 1:
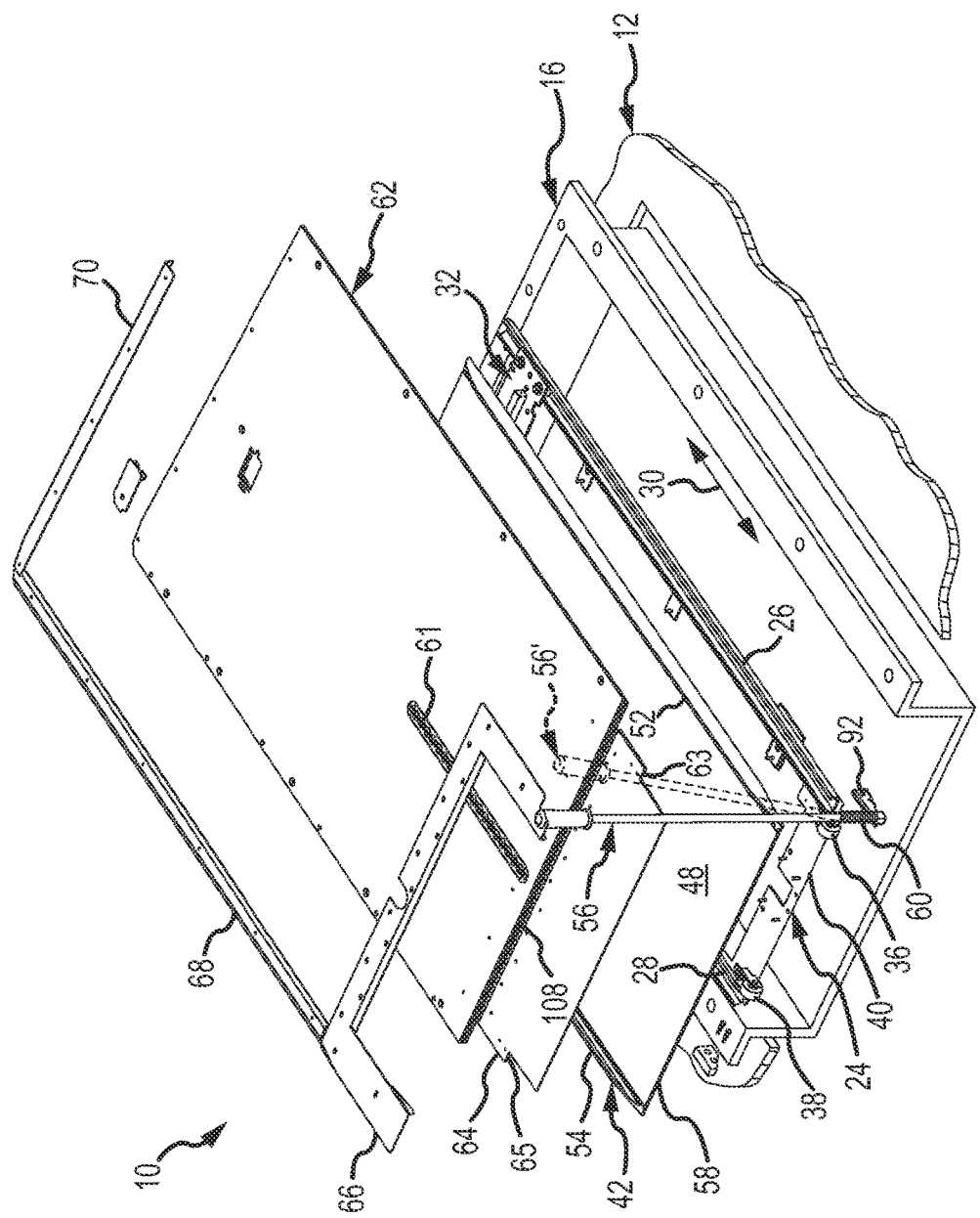
FIG. 1 is an exploded view in perspective of one embodiment of an in-floor vehicle ramp system.

An in-floor vehicle ramp system 10 according to one embodiment of the present invention is best seen in FIGS. 1-5 and is shown and described herein as it may be mounted to a floor section or chassis 12 of a vehicle 14 by means of a structural adapter assembly or floor "tub" 16. In one embodiment, the vehicle ramp system 10 is manually operated and may be moved by hand between a retracted position 18, shown in FIGS. 2 and 3, and an extended or deployed position 20, shown in FIG. 4. When in the retracted position 18, the vehicle ramp system 10 is fully stowed within vehicle 14, thereby allowing vehicle door 22 to be closed and the vehicle 14 to be operated normally. When in the extended position 20, the vehicle ramp system 10 will allow a wheelchair (not shown) to be readily loaded into and unloaded from vehicle 14 via the ramp system 10.

Referring primarily now to FIGS. 1 and 6, the vehicle ramp system 10 may comprise a base frame or member 24 configured to be mounted to the floor section 12 of vehicle 14. As will be described in further detail herein, in most installations it will be necessary to modify the floor section 12 of the vehicle 14 to accommodate the vehicle ramp system 10. Such a modification typically involves the removal of at least a portion of the stock vehicle floor assembly. The structural adapter assembly or floor "tub" 16 is designed or configured to replace the section of the vehicle floor that was removed and to accommodate the vehicle ramp system 10. In such instances, then, the base frame assembly 24 will not be directly mounted to the floor section 12 of the vehicle 14, but rather will be mounted to the structural adapter assembly 16 which in turn is mounted to the floor section or chassis 12 of vehicle 14.

Regardless of the particular manner in which base frame 24 is mounted to the vehicle 14, base frame 24 may also include a pair of track members 26 and 28 mounted thereto. The track members 26 and 28 are mounted in generally parallel, spaced-apart relation so that they extend along a longitudinal direction 30, as best seen in FIG. 6. A trolley assembly 32 having a plurality of guide wheels 34 mounted thereto is sized to engage the track members 26 and 28 so that trolley member 32 may be moved back and forth along longitudinal direction 30. Base frame 24 also may be provided with a pair of ramp support rollers 36, 38. Ramp support rollers 36, 38 may be mounted in spaced-apart relation near an outboard end 40 of base frame 24.

Figure 3:
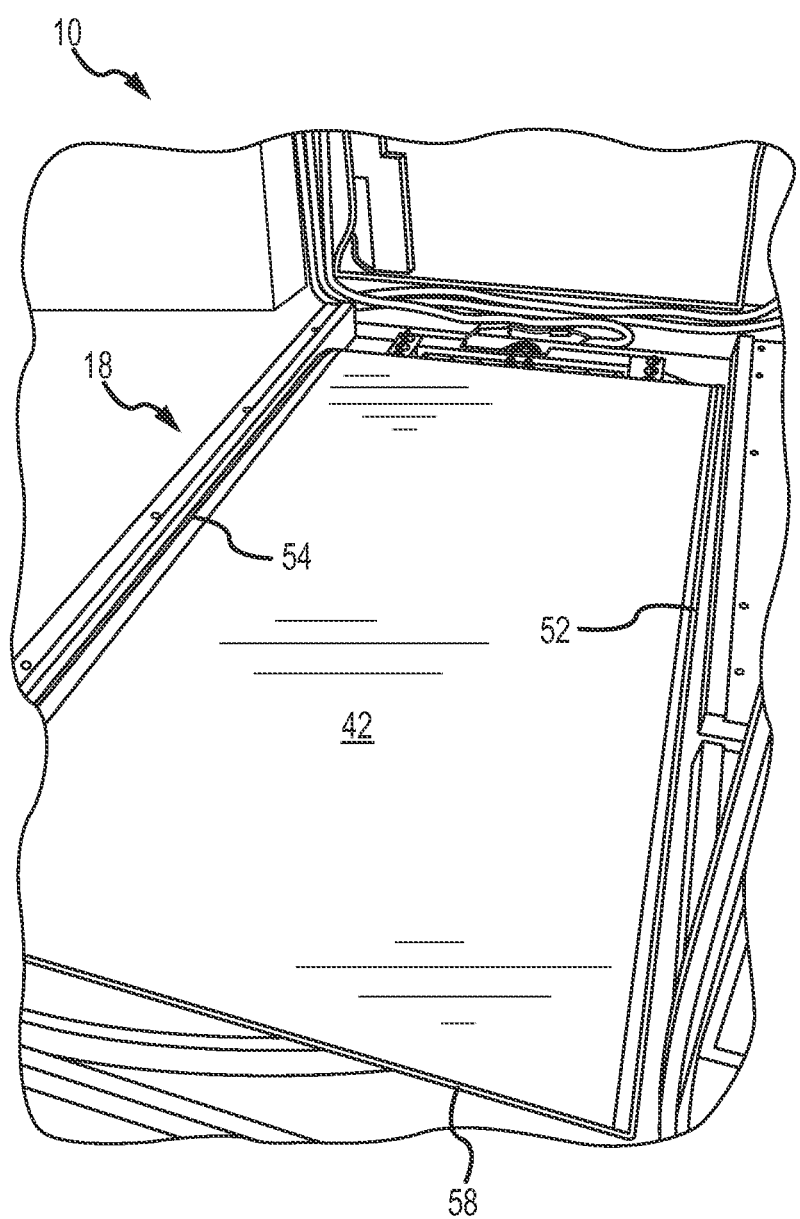
FIG. 3 is a perspective view of the installed vehicle ramp system shown in FIG. 2 with the floor plate removed to show the relative position of the ramp member when in the retracted position.
Figure 4:
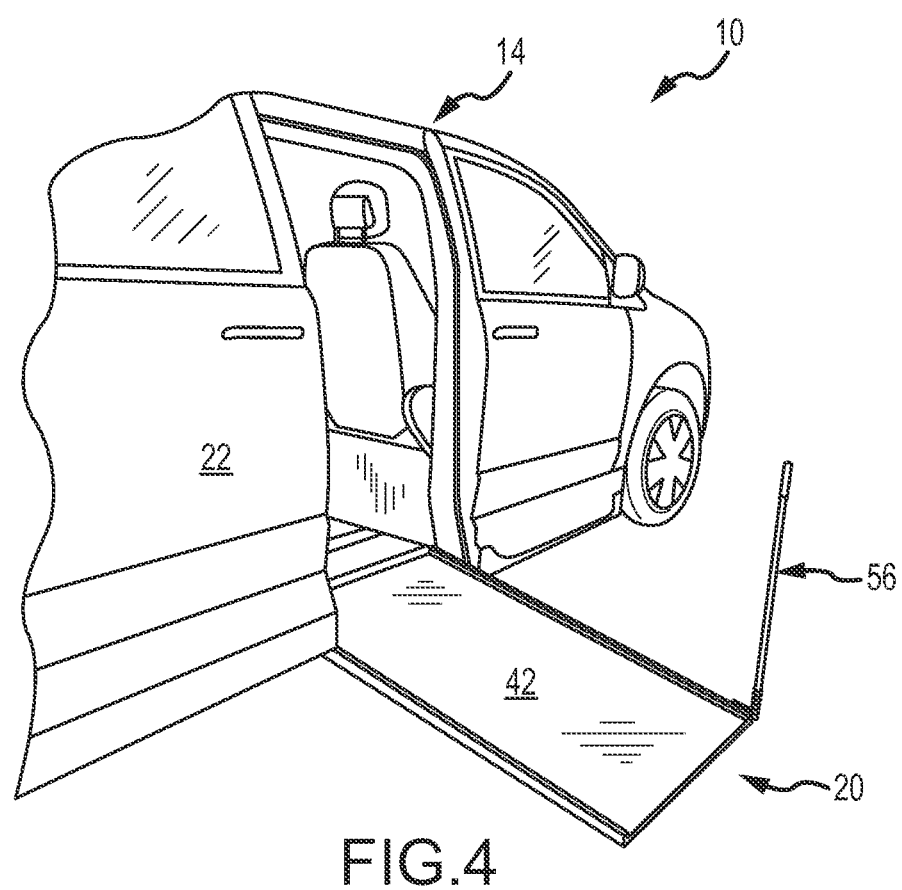
FIG. 4 is a perspective view of the installed vehicle ramp system with the ramp member in the extended position.

The vehicle ramp system 10 may also comprise a ramp member 42. Ramp member 42 is mounted to the base frame 24 so that ramp member 42 may be moved in the longitudinal direction 30 between the retracted position 18 (FIGS. 2 and 3) and the extended position 20 (FIG. 4). In one embodiment, ramp member 42 is pivotally mounted to the trolley assembly 32 via hinge assembly 44, as best seen in FIG. 6. As will be described in greater detail below, the cooperative engagement of ramp member 42 with trolley assembly 38 and ramp support rollers 36, 38 allows ramp member 42 to be readily and easily moved between the retracted and extended positions 18 and 20. The pivotal mounting arrangement of ramp member 42 and trolley assembly 32 further allows ramp member 42 to be lowered to the ground when ramp member 42 is moved to the extended position 20. See FIG. 4.

With reference now to FIGS. 6 and 7, in one embodiment ramp member 42 may comprise a laminated structure in which a core section 46 is bonded between respective upper and lower face plates or members 48 and 50. Core section 46 may comprise an aluminum honeycomb configuration or structure, whereas upper and lower face members 48 and 50 may comprise aluminum sheet material. Alternatively, other configurations and materials may be used, as will be described in further detail herein. Ramp member 42 also may be provided with a pair of side rails 52, 54. Side rails 52 and 54 may be mounted to the upper face member 48 of ramp 42 in generally parallel, spaced-apart relation, as best seen in FIG. 6.

Figure 5:
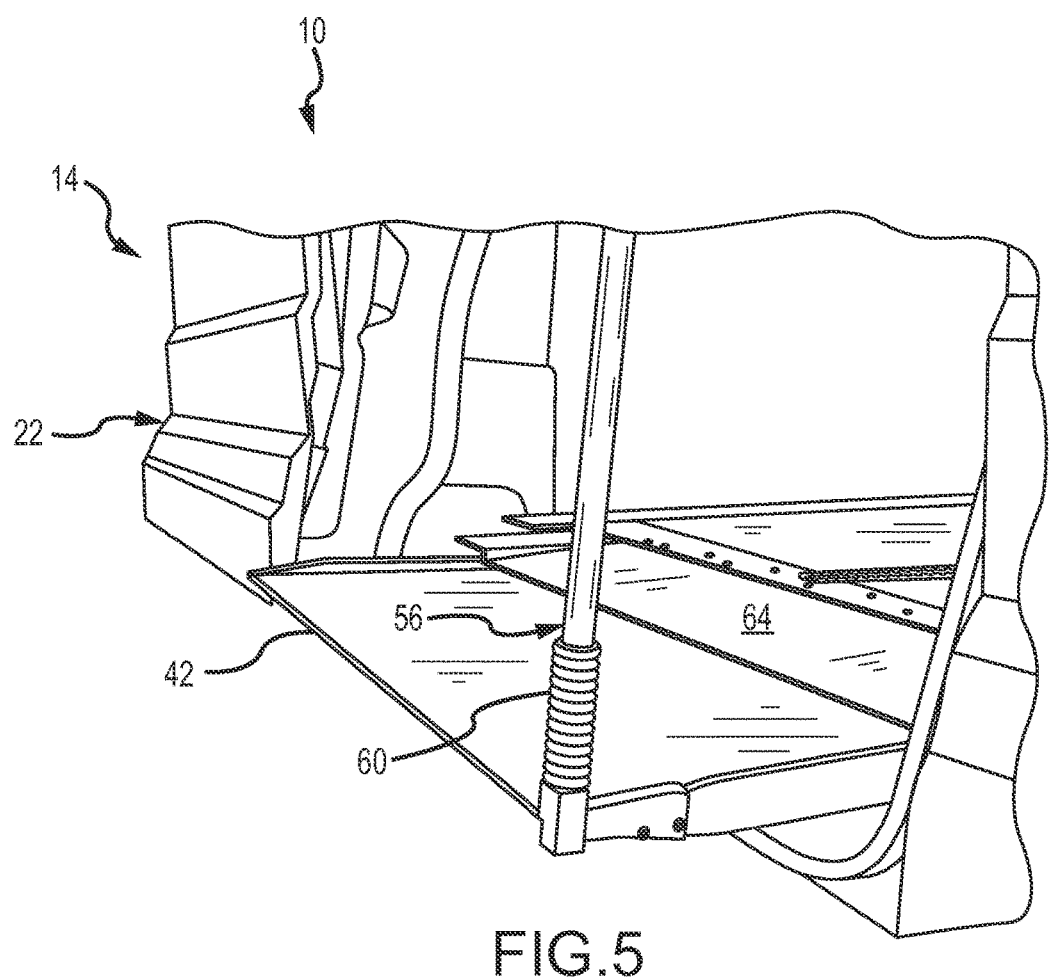
FIG. 5 is an enlarged perspective view of the installed vehicle ramp system with the ramp member in an intermediate position and showing the mounting arrangement of the handle assembly.

The vehicle ramp system 10 may also comprise a handle assembly 56. Handle assembly 56 allows a user to easily move ramp member 42 in the longitudinal direction 30 between the retracted and extended positions 18 and 20. In the particular embodiment shown and described herein, handle assembly 56 is mounted proximate a leading edge 58 of ramp member 42, as best seen in FIGS. 1, 4, and 5. As will be described in further detail herein, in one embodiment, handle assembly 56 may be mounted to the ramp member 42 via a spring assembly 60. Spring assembly 60 allows the handle assembly 56 to be readily moved or articulated to a deflected position 56' (e.g., as shown in phantom lines in FIG. 1) by the user during deployment and/or storage of the ramp member 42.

Figure 2:
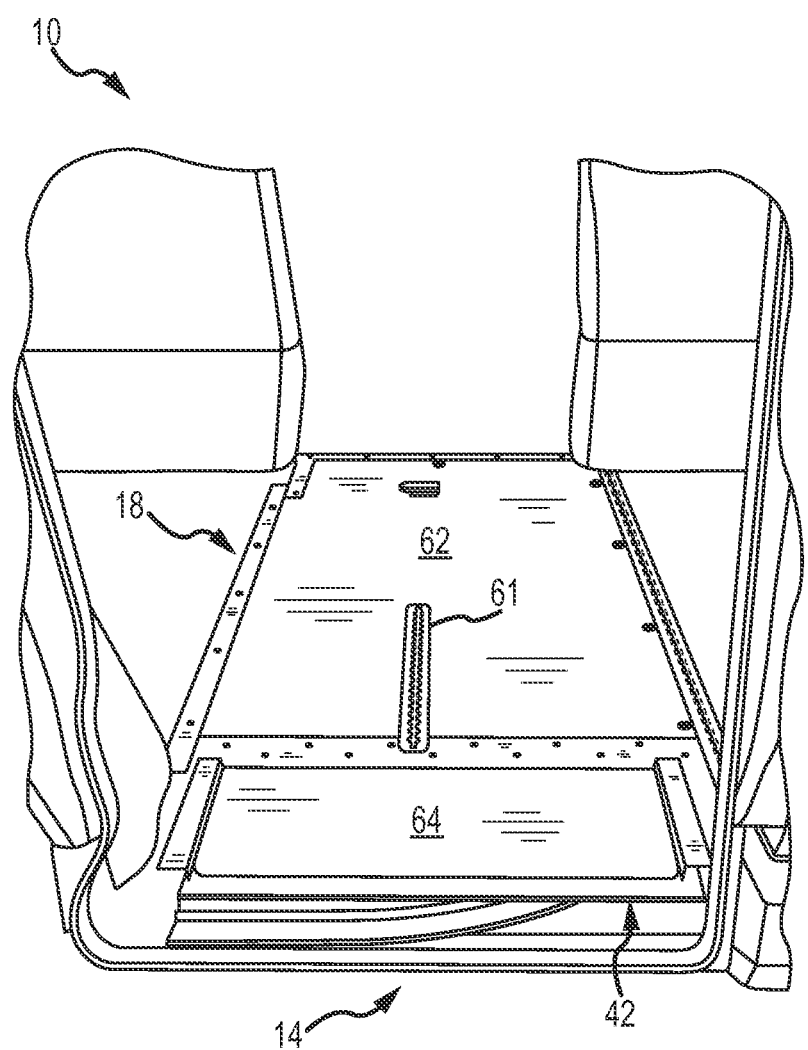
FIG. 2 is a perspective view of the in-floor vehicle ramp system of FIG. 1 installed in a vehicle and with the ramp member in the retracted position.

Referring back now to FIGS. 1 and 2, vehicle ramp system 10 may also be provided with a floor plate assembly 62. Floor plate assembly 62 is configured to mount to structural adapter assembly 16. Floor plate assembly 62 covers the ramp and base members 42 and 24 of vehicle ramp system 10 when the same is installed within the vehicle 14. Floor plate assembly 62 thereby provides vehicle 14 with a substantially continuous and level interior floor configuration, as best seen in FIG. 2. Floor plate assembly 62 may be provided with a suitable anchor member 61 to allow a wheelchair to be firmly anchored to the floor plate assembly 62.

Floor plate assembly 62 may also include a transition plate 64. Transition plate 64 closes a gap that would otherwise exist between the ramp member 42 and the floor plate assembly 62 when the ramp member 42 is in the extended position 20. See FIGS. 4 and 5. Transition plate 64 therefore provides a smooth transition between the ramp member 42 and the floor plate assembly 62. Finally, an escutcheon plate 66 and trim members 68 and 70 may also be provided to transition or fair the floor plate 62 into the existing vehicle floor section 12, as may be required or desired in any particular embodiment.

The vehicle ramp system 10 may be operated as follows to deploy and stow the ramp member 42. Assuming that the ramp system 10 is in the retracted position 18 (FIGS. 2 and 3) and the vehicle door 22 in the opened position, a user (not shown) may deploy the ramp system 10 by grasping the handle assembly 56 and pulling it away from the vehicle 14. This will cause the ramp member 42 to move or extend along the longitudinal direction 30. In an embodiment wherein the handle assembly 56 includes a spring assembly 60, the user will be able to move or articulate the handle assembly 56 (e.g., to a deflected position 56', FIG. 1) with respect to ramp member 42. The articulating handle assembly 56 may allow the user to increase the leverage applied to the ramp member 42 and will also allow the vehicle ramp system 10 to more readily accommodate various positions, statures, and physical abilities of the users.

As the user continues to move the ramp member 42 along the longitudinal direction 30 (i.e., toward the extended position 20), the cooperative engagement of ramp section 42 with the trolley assembly 32 and support rollers 36, 38 will cause the leading edge 58 of ramp member 42 to be gradually and gently lowered toward the ground as the ramp 42 is extended. Once the ramp member 42 has been fully extended, a wheelchair (not shown) may be rolled up the ramp member 42 and ultimately onto the floor plate 62 of ramp system 10. Once in the vehicle 14, the wheelchair may be further positioned and/or re-oriented as may be desired or required in any particular circumstance. Thereafter, the wheelchair may be secured to the anchor member 61 provided in floor plate assembly 62.

The user may move the ramp member 42 to the retracted position 18 by grasping the handle assembly 56 and gently lifting the leading edge 58 of ramp member 42 while moving the handle assembly 56 toward the vehicle. Here again, the cooperative engagement of the ramp member 42 with the trolley assembly 32 and support rollers 36, 38 will assist in gradually elevating the leading edge 58 of ramp member 42 as the ramp member 42 moves back toward the retracted position 18.

A significant advantage of the in-floor vehicle ramp system 10 according to the present invention is that it provides a ramp system that may be easily deployed and stowed by a user but without the need for a powered actuation system. For example, the cooperative engagement of the ramp member 42 with the trolley assembly 32 and the support rollers 36, 38 allows a user to easily control the movement of the ramp member 42 as it is moved in the longitudinal direction 30 between the retracted and extended positions 18 and 20. That is, the user will be able to easily and gently lower the leading edge 58 of ramp member 42 to the ground without the need to support the entire weight of the ramp member 42. Similarly, the engagement of the ramp member 42 with the support rollers 36, 38 will assist in lifting or elevating the leading edge 58 of ramp member 42 as the user moves it toward the retracted position 18. Again, the user will not need to lift the entire weight of the ramp member 42 to return it to the retracted position 18.

Still other advantages are associated with the handle assembly 56. For example, the mounting of the handle assembly 56 near the leading edge 58 of ramp assembly 42 will allow a user to exert significant leverage on the ramp assembly 42 during ramp deployment and stowage. Still further, in an embodiment wherein the handle assembly 56 is provided with a spring assembly 60, the user will be able to easily articulate or move the handle assembly 56 (e.g., to a deflected position shown in phantom lines in FIG. 1) as may be required during both the deployment and stowage operations. Still further, the articulating handle assembly 56 will allow the ramp system 10 to be easily operated by users having a wide range of physical abilities, statures, and positioning with respect to the vehicle 14.

Still yet other advantages are associated with the laminated structure of the ramp member 42. For example, the laminated structure provides the ramp member 42 with a combination of high rigidity and light weight, thereby minimizing deflection of the ramp member 42 while under load (i.e., when a wheelchair is ascending and descending the ramp), while at the same time allowing the ramp to be easily deployed and stowed without the need for power assistance. Still further, the laminated construction of the ramp member 42 increases the load handing ability of the ramp 42 for a given thickness.

Having briefly described various embodiments of the vehicle ramp system 10, as well as some of its more significant features and advantages, various embodiments of the vehicle ramp system according to the present invention will now be described in detail. However, before proceeding with the description it should be noted that the various embodiments of the vehicle ramp system 10 are shown and described herein as they could be used in conjunction with a mini-van type of passenger vehicle having at least one sliding passenger door 22 through which the wheelchair could be loaded and unloaded. However, the vehicle ramp system 10 could be used on other vehicle types (regardless of door type, number or configuration) now known in the art or that may be developed in the future, and persons having ordinary skill in the art would be able to readily adapt the vehicle ramp system 10 for use in us other vehicle types after having become familiar with the teachings provided herein. Consequently, the present invention should not be regarded as limited to use with the particular type of vehicle 14 shown and described herein.

Referring back now to FIGS. 1-5, one embodiment of the in-floor vehicle ramp system 10 is shown and described herein as it could be installed in a mini-van type of passenger vehicle 14 having at least one sliding door 22 provided therein. In such an installation, the vehicle ramp system 10 will be mounted below an existing floor plane of the vehicle 14, as best seen in FIGS. 2 and 3. Alternatively, other configurations are possible, as would become apparent to persons having ordinary skill in the art after having become familiar with the teachings provided herein.

In the particular embodiment shown and described herein, a portion of the floor section 12 of vehicle 14 was removed in order to provide sufficient space for the vehicle ramp system 10. Accordingly, a structural adapter assembly or floor tub 16 (shown schematically in FIG. 1) replaces the portion of the floor section 12 that was removed. Structural adapter assembly 16 provides the required structural reinforcement to the modified vehicle chassis 12 and also provides a suitable mounting location for the vehicle ramp system 10. However, because the details of such a structural adapter assembly 16 will differ depending on the particular vehicle in which the ramp system 10 is to be used and could be readily provided by persons having ordinary skill in the art after having become familiar with the teachings provided herein, the structural adapter assembly 16 that may be required or desired in any particular installation will not be described in further detail herein.

Referring now primarily to FIGS. 1, 6, and 8, the in-floor vehicle ramp system 10 may comprise a generally rectangularly-shaped base frame 24. While the base frame 24 may be configured to mount directly to the floor section or chassis 12 of vehicle 14, in most applications, the base frame 24 will be mounted to a structural adapter assembly 16, in the manner already described. Accordingly, base frame 24 may be provided with a plurality of mounting lugs 72 to allow the base frame 24 to be secured to the floor section 12 or structural adapter assembly 16, as the case may be. See FIGS. 6 and 8. Base frame 24 also may be provided with various other features or mounting points 74 to allow other systems and devices that may be required or desired in any particular embodiment to be conveniently mounted to base frame 24. For example, in another embodiment 110 described herein, components of a drive system 111 (FIGS. 16 and 17) could be mounted to such other features or mounting points 74 provided on base frame 24. However, because such other features or mounting points could be readily provided by persons having ordinary skill in the art after having become familiar with the teachings provided herein, such other features or mounting points will not be described in further detail herein.

Base frame 24 may be fabricated from any of a wide range of materials, such as metals, plastics, or combinations thereof, that would be suitable for the intended application. Consequently, the present invention should not be regarded as limited to a base frame 24 fabricated from any particular type of material. However, by way of example, in one embodiment, base frame 24 is fabricated from mild sheet steel.

A pair of track members 26, 28 may be mounted to base member 24, as best seen in FIGS. 6 and 8. Track members 26, 28 are mounted to base member 24 in generally parallel, spaced-apart relation so that they extend along a longitudinal direction 30. Each track member 26, 28 may comprise an elongate member having a C-shaped cross-section sized to receive the guide wheels 34 provided on trolley assembly 32. See FIG. 9. The C-shaped cross-section of tracks 26, 28 constrains the movement of the trolley assembly 32 in the vertical and transverse directions 76 and 78, respectively, allowing the trolley assembly 32 to move only in the longitudinal direction 30. Track members 26, 28 may be secured to the base frame 24 by any of a wide range of methods, such as by a plurality of screws or bolts (not shown). Alternatively, other arrangements are possible.

Track members 26, 28 may be fabricated from any of a wide range of materials, such as metals or plastics, now known in the art or that may be developed in the future that are, or would be, suitable for the intended application. Consequently, the present invention should not be regarded as limited to track members 26, 28 fabricated from any particular type of material. However, by way of example, in one embodiment, track members 26, 28 are formed from mild sheet steel.

Still referring primarily to FIGS. 6 and 8, trolley assembly 32 may comprise a generally elongate member sized to span the distance between the track members 26 and 28 and also to receive or mount a trailing edge 80 of ramp member 42. Trolley assembly 32 is also sized to receive a plurality of guide wheels 34 for engaging the track members 26, 28 in the manner already described. Generally speaking, it will be preferable to provide two guide wheels 34 on each end 82, 84 of trolley assembly 32. Such an arrangement will prevent trolley assembly 32 from rotating (i.e., about transverse axis 78) as it rolls along base frame 24. So configured, trolley assembly 32 may be rolled along track members 26 and 28 in the longitudinal direction 30, but will be constrained from moving in the vertical and transverse directions 76 and 78. The mounting arrangement also prevents trolley assembly 32 from rotating about any of the longitudinal, vertical, and lateral axes 30, 76, and 78.

Trolley assembly 32 may be fabricated from any of a wide range of materials, such as metals or plastics, now known in the art or that may be developed in the future that would be suitable for the intended application. Consequently, the present invention should not be limited to trolley assemblies 32 fabricated from any particular type of material. However, by way of example, in one embodiment, trolley assembly 32 is fabricated from mild sheet steel. Trolley assembly 32 may also be provided with a reinforcing member 33 if desired or required for any particular installation.

Base frame 24 may also be provided with a pair of ramp support rollers 36, 38. Ramp support rollers 36, 38 may be mounted in spaced-apart relation near or at the outboard end 40 of base frame 24. See FIGS. 1 and 6. Ramp support rollers 36, 38 support to ramp member 42 and assist in elevating and lowering the leading edge 58 of ramp member 42 during stowage and deployment of ramp member 42 in the manner described herein. Support rollers 36, 38 may comprise any of a wide range of roller assemblies that are well-known in the art and readily commercially available. Consequently, the particular support rollers 36, 38 that may be used in one embodiment of the present invention will not be described in further detail herein.

Ramp member 42 is mounted to the base frame 24 so that ramp 42 may be moved along the longitudinal direction 30 between the retracted position 18 (FIGS. 2 and 3) and the extended position 20 (FIG. 4). In the particular embodiment shown and described herein, the trailing end 80 of ramp member 42 is pivotally mounted to the trolley assembly 32 by means of a hinge assembly 44, as best seen in FIG. 6. Any of a wide range of fasteners, such as a plurality of screws 86, may be used to secure the hinge assembly 44 to the trolley assembly 32. The cooperative engagement of the ramp 42 with trolley assembly 32 and support rollers 36, 38 allows ramp member 42 to be easily moved in the longitudinal direction 30 between the retracted and extended positions 18 and 20. Still further, the pivotal mounting of the trailing end 80 of ramp 42 to trolley assembly 32 allows the leading end 58 of ramp 42 to be lowered to the ground when the ramp member 42 is moved to the extended position 20. See FIG. 4.

While the ramp member 42 may comprise any of a wide range of sheet like or plate-like materials, in one embodiment, ramp member 42 comprises a laminated structure, as best seen in FIG. 7. More specifically, ramp member 42 may comprise a core section 46 that is bonded between respective upper and lower face members 48 and 50. Such a laminated construction allows the ramp member 42 to be light in weight and very rigid. The laminated structure will also allow the ramp member 42 to have a high load rating for a given thickness. While the various constituents of laminated ramp member 42 may be fabricated from any of a wide range of materials, in one embodiment, the core section 46 comprises an aluminum honeycomb material. Similarly, the upper and lower face members 48 and 50 also comprise aluminum. The core section 46 may be bonded to the upper and lower face members 48 and 50 by any of a wide variety of materials and techniques known in the art for this purpose.

The thicknesses of the various constituents of the laminated ramp member 42, i.e., the core section 46 and upper and lower face members 48 and 50, may be selected to provide the ramp member 42 with the desired strength and degree of rigidity in view of the particular materials selected (e.g., aluminum). Consequently, the present invention should not be regarded as limited to any particular ramp structure made from any particular type of material. If desired, the upper face member 48 of ramp member 42 may be provided with any of a wide range of non-slip type coatings (not shown) to provide the upper face member 48 of ramp 42 with surface texture suitable for the intended application and to reduce the likelihood of slippage.

Figure 10:
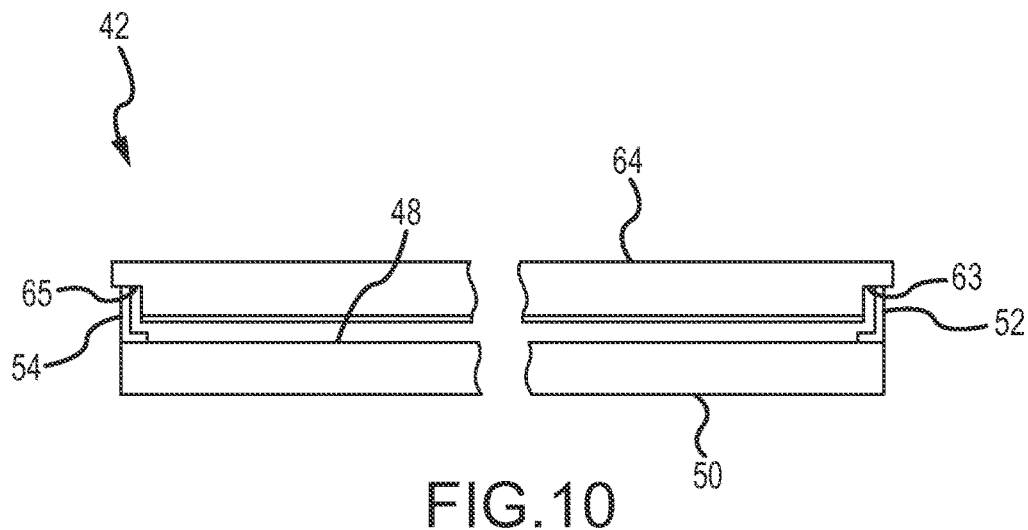
FIG. 10 is an end view in elevation of the ramp member showing the positioning of the two L-shaped side rails and transition plate.

Ramp member 42 may also be provided with a pair of side rails 52, 54. Side rails 52, 54 may be mounted to the upper face member 48 of ramp 42 in generally parallel, spaced-apart relation, as best seen in FIG. 6. Each side rail 52, 54 may have a generally L-shaped cross-section, as best seen in FIG. 10. Further, the leading ends 88 of side rails 52, 54 may have a tapered profile, whereas the trailing ends 90 may have a curved profile, as best seen in FIG. 11.

Figure 11:
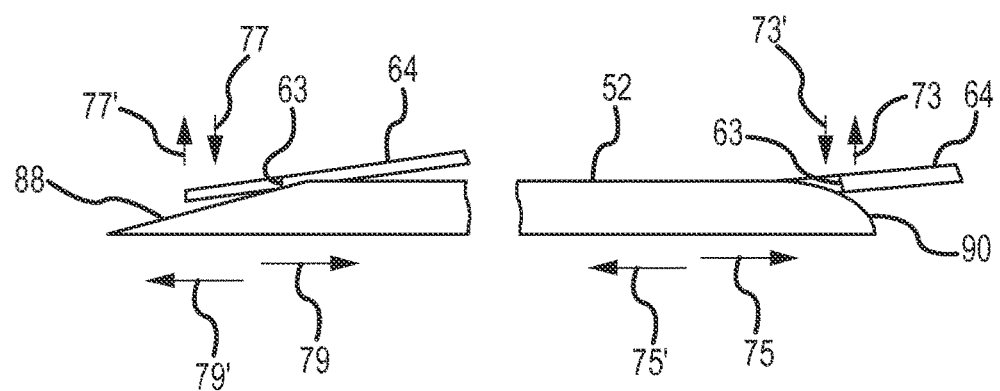
FIG. 11 is a side view in elevation of the tapered leading end and curved trailing end of a side rail and showing the engagement of the transition plate therewith.

Referring now to the right side of FIG. 11, the curved profile of the trailing ends 90 of side rails 52, 54 lifts (indicated by arrow 73) the transition plate 64 when the ramp 42 is moved from the extended position 20 to the retracted position 18 (indicated by arrow 75). The lifting of the transition plate 64 minimizes the likelihood that the transition plate 64 will become hung-up on or otherwise interfere with the upper face member 48 of ramp member 42 during the retraction process. Conversely, the curved profile of the trailing ends 90 of side rails 52, 54 lowers (as indicated by arrow 73') the transition plate 64 when the ramp 42 is moved to the fully extended position 20 (indicated by arrow 75'). The lowering of transition plate 64 closes a gap that would otherwise exist between ramp member 42 and floor plate 62 when the ramp 42 is in the fully extended position 20.

With reference now to the left side of FIG. 11, the tapered profile of leading ends 88 of side rails 52, 54 allows the transition plate 64 to fully drop down (indicated by arrow 77) when the ramp 42 moves to the fully retracted position 18 (indicated by arrow 79). The lowering of the transition plate 62 closes a gap that would otherwise exist between the ramp member 42 and the floor plate 62 when the ramp 42 is in the fully retracted position 18. Conversely, the tapered profile of leading ends 88 of side rails 52, 54 lifts (indicated by arrow 77') the transition plate 64 when the ramp 42 is moved from the retracted position 18 toward the extended position (indicated by arrow 79').

Figure 12:
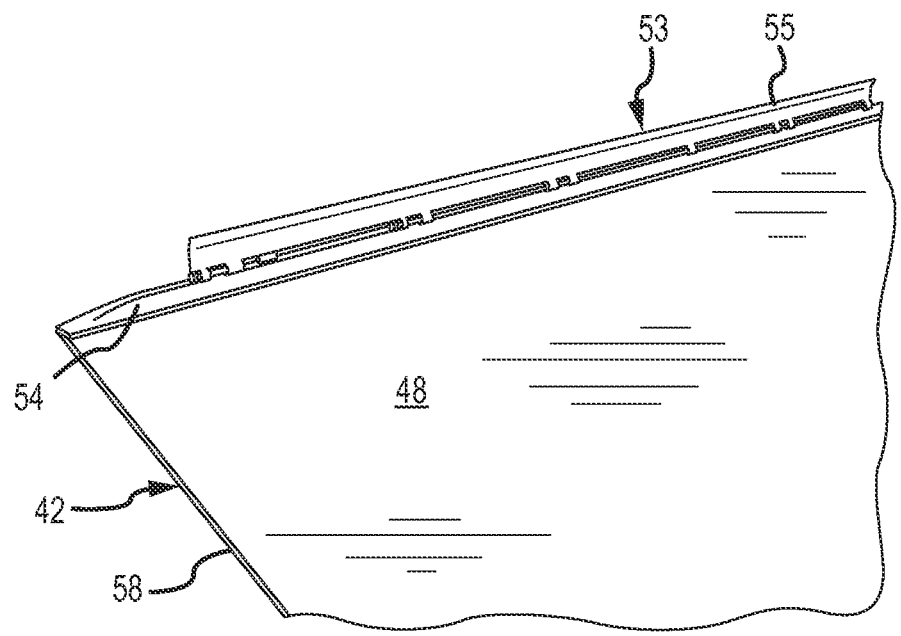
FIG. 12 is an enlarged perspective view of a portion of the ramp member having a safety rail shown in an extended position.
Figure 13:
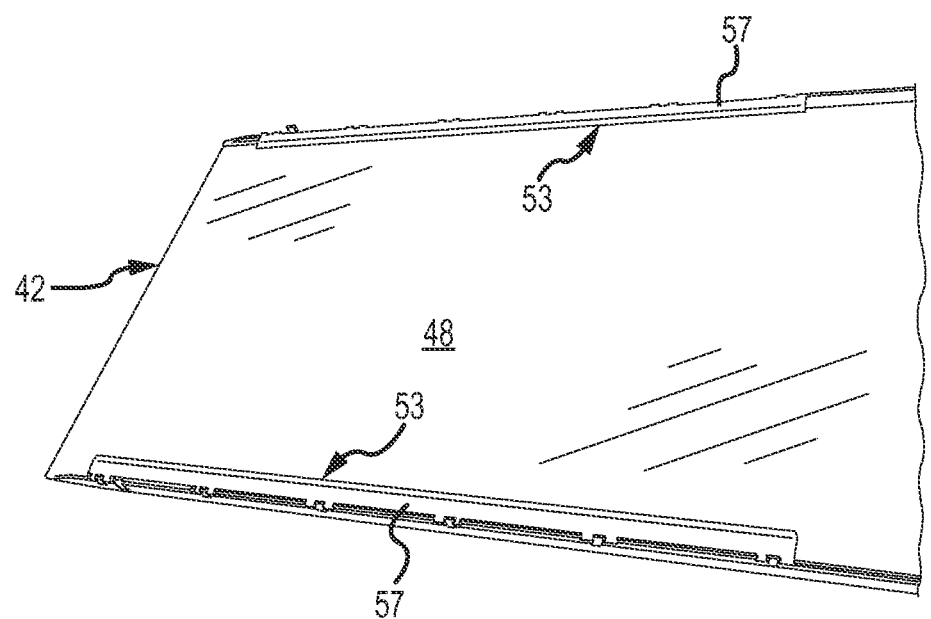
FIG. 13 is a perspective view of the ramp member having safety rails shown in a folded position.
Figure 14:
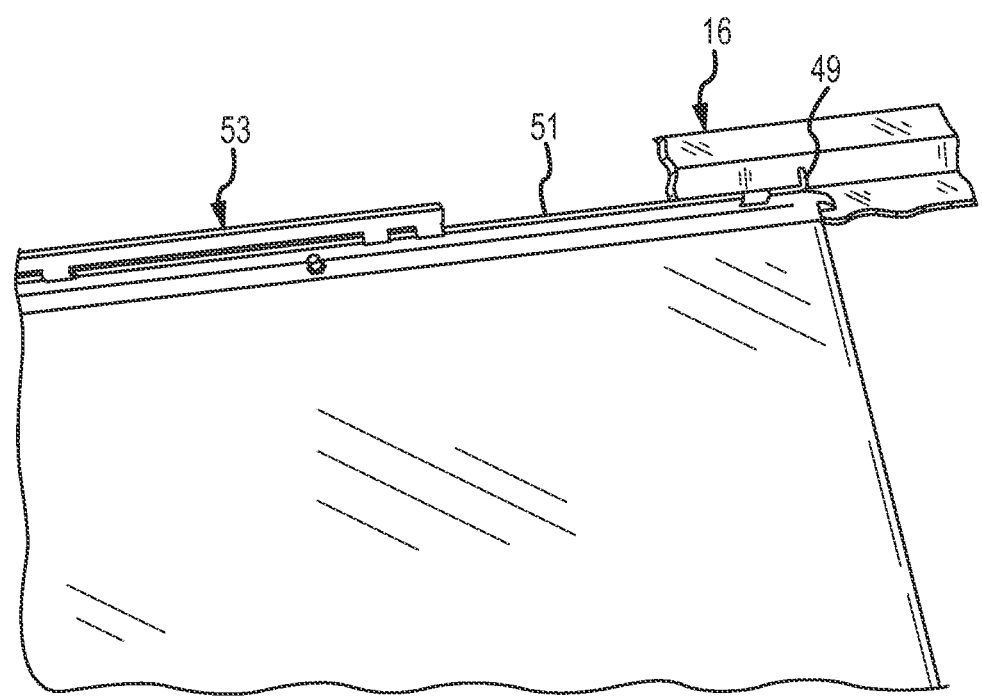
FIG. 14 is an enlarged perspective view of an actuating rod and arm portion of a safety rail.
Figure 15:
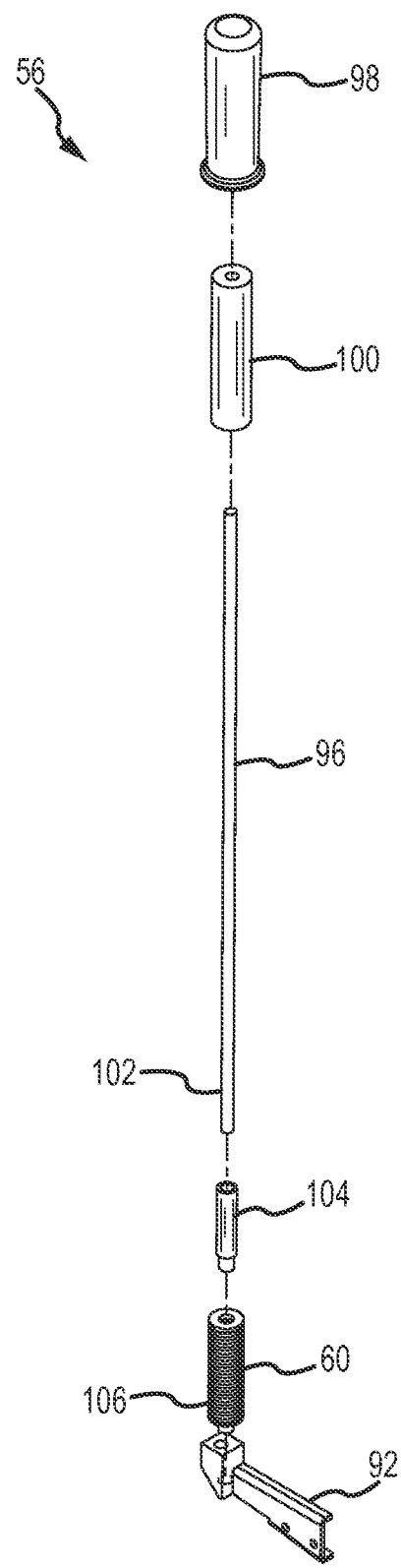
FIG. 15 is an exploded view of an embodiment of a handle assembly.

In some embodiments, either or both of side rails 52, 54 may also be provided with a corresponding safety rail 53, as best seen in FIGS. 12-14. The safety rail 53 may provide additional assurance that a wheelchair (not shown) will not fall off the sides of ramp member 42. In one embodiment, each safety rail 53 is pivotally mounted to the side rails 52 and 54. Such a pivotal mounting arrangement will allow each safety rail 53 to be pivoted or moved between an extended position 55, shown in FIG. 12, and a retracted or folded position 57, as shown in FIG. 13. In one embodiment, the safety rail or rails 53 may be manually moved between the extended and folded positions 55 and 57. Alternatively, in another embodiment, each safety rail 53 may be provided with an actuating rod 51 having an arm portion or section 49 provided on the end thereof. See FIG. 14. Arm section 49 of actuating rod 51 may be configured to engage a suitable cam or slot member (not shown) provided on the structural adapter assembly 16. The engagement of the arm section 49 with the cam member (not shown) may be used to rotate the safety rail(s) between the extended position 55 as the ramp member 42 is moved from the fully retracted position 18 (FIGS. 2 and 3) toward the extended position 20 (FIG. 4). Similarly, the engagement of the arm section 49 of actuating rod 51 with the cam member (not shown) will rotate the safety rail 53 to the folded position 57 when the ramp member 42 is moved toward the fully retracted position 18.

Side rails 52 and 54 and optional safety rail(s) 53, if provided, may be fabricated from any of a wide range of materials, such as metals or plastics, that would be suitable for the particular application. Consequently, the present invention should not be regarded as limited to side rails 52, 54 and safety rails 53 fabricated from any particular type of material. However, by way of example, in one embodiment, side rails 52 and 54 are fabricated from extruded aluminum. Safety rails 53 are fabricated from sheet aluminum. Actuating rod 51 may be fabricated from steel.

The vehicle ramp system 10 may also comprise a handle assembly 56. In one embodiment, handle assembly 56 may be mounted proximate the leading edge 58 of ramp member 42 by means of a bracket 92 and screws 94, as best seen in FIGS. 1, 4, 5, and 6. While handle assembly 56 may comprise a simple pole or rod-like structure, in one embodiment, handle 56 is mounted to bracket 92 via a spring 60. Spring 60 allows handle assembly 56 to be articulated (e.g., moved to a deflected position 56' shown in FIG. 1) with respect to the leading edge 58 of ramp member 42. The ability to move or articulate the handle assembly 56 significantly aids the user in the deployment and stowage of the ramp member 42. That is, the spring 60 will allow the handle assembly 56 to be articulated or moved in a wide variety of positions to allow the ramp system 10 to be easily operated by a wide variety of users having a wide range of physical abilities, statures, and positioning with respect to the vehicle 14.

With reference now to FIG. 12, handle assembly 56 may comprise an elongated rod 96 that extends between the spring 60 and a grip 98. A sleeve 100 may be provided between the rod 96 and grip 98 to allow a commercially available grip to be used. Alternatively, grip 98 could be sized to be received directly by rod 96. A lower end 102 of rod 96 may be received by a threaded sleeve 104 that is adapted to be received by spring 60. Alternatively, rod 96 may be secured directly to spring 60. Lower end 106 of spring 60 may be mounted to bracket 92. Bracket 92 in turn may be mounted proximate the leading edge 58 of ramp member 42, as best seen in FIGS. 1, 4, and 5. If desired, the interior of vehicle 14 may be provided with a suitable fastening device, such as a clamp or strap (not shown), to secure the handle assembly 56 when the ramp 42 is stowed within vehicle 14.

The various components of handle assembly 56 may be fabricated from any of a wide range of materials that are now known in the art or that may be developed in the future that are (or would be) suitable for the intended application. By way of example, in one embodiment, rod 96 is fabricated from fiberglass, although other materials, such as aluminum, stainless steel, or plated steel, could also be used. The use of fiberglass will provide the handle assembly 56 with additional flexibility which may be desirable in certain applications. Grip 98 and sleeve 100 may be fabricated from rubber or a plastic material, whereas sleeve 104 may be fabricated from aluminum, stainless steel, or plated steel. Spring 60 may be fabricated from spring steel, whereas bracket 92 may be fabricated from aluminum, or other suitable material.

Referring back now to FIGS. 1 and 2, the vehicle ramp system 10 may also comprise floor plate assembly 62. As described earlier, floor plate assembly 62 may be sized or configured to mount to structural adapter assembly 16, thus overlay or cover the ramp and base members 42 and 24 when the vehicle ramp system 10 is installed in vehicle 14. Floor plate assembly 62 thereby provides the vehicle 14 with a substantially continuous and level interior floor configuration, as best seen in FIG. 2. Floor plate 62 may also be provided with anchor member 61 to allow a wheelchair to be securely fastened within the vehicle 14. Systems for anchoring wheelchairs within vehicles are commonly standardized. Consequently, anchor member 61 may comprise a standardized anchor member or bracket specifically configured for this purpose. Alternatively, non-standardized anchoring systems could be used, if desired. If desired, floor plate 62 may be covered with carpet to match the floor carpet within the vehicle 14, although other materials may be used.

Transition plate 64 may be pivotally mounted to the floor plate assembly 62, such as by means of a hinge assembly 108. As already described, the pivotal mounting of transition plate 64 to floor plate assembly 62 allows the transition plate 64 to "float" over the ramp member 42 during deployment and stowage and provides a smooth transition between the ramp member 42 and the floor plate assembly 62, particularly when the ramp member 42 is in the extended position 20. Notches 63 and 65 in transition plate 64 engage the respective side rails 52 and 54 on ramp member 42 and in particular the tapered and curved profiles of leading and trailing ends 88 and 90. The engagement of the notches 63 and 65 with the tapered and curved profiles of side rails 52 and 54 raises and lowers the transition plate 64 when the ramp member 42 is moved between the retracted and extended positions 18 and 20 in the manner already described.

Vehicle ramp system 10 may also be provided with an escutcheon plate 66 and trim members 68 and 70. As already described, the escutcheon plate 66 and trim members 68 and 70 provide a smooth transition or fairing between the floor plate 62 and the existing vehicle floor 12, as best seen in FIG. 2.

The floor plate 62, transition plate 64, escutcheon plate 66 and trim members 68 and 70 may be fabricated from any of a wide range of materials, such as metals or plastics, that are now known in the art or that may be developed in the future that are or would be suitable for the intended application. Consequently, the present invention should not be regarded as limited to any particular types of materials for these components. However, by way of example, in one embodiment, these members may be fabricated from mild sheet steel. Escutcheon plate 66 and trim members 68 and 70 further may be plated (e.g., with chrome) if desired.

Figure 16:
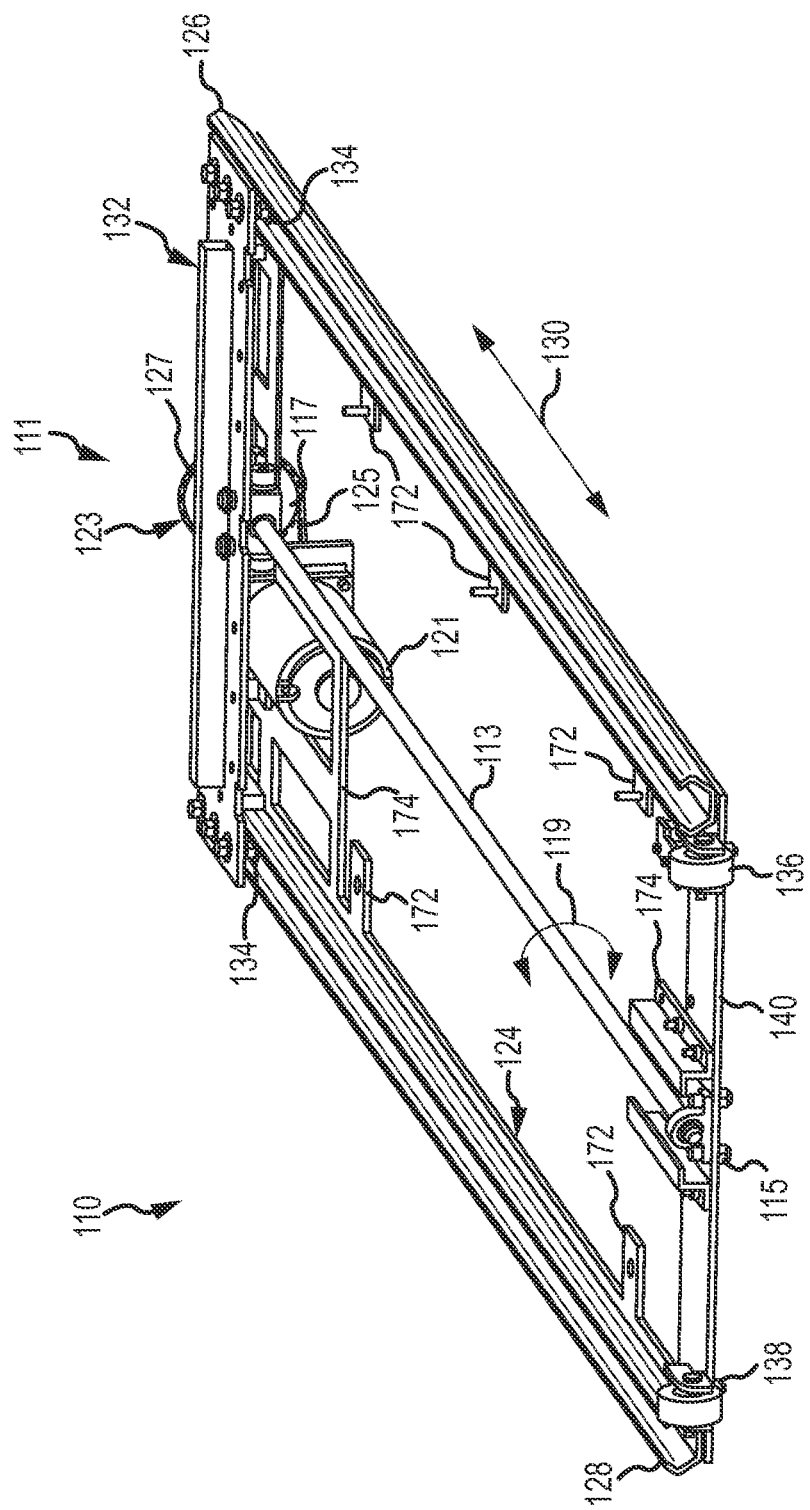
FIG. 16 is a perspective view of a base member and trolley assembly having an optional drive system mounted thereto.
Figure 17:
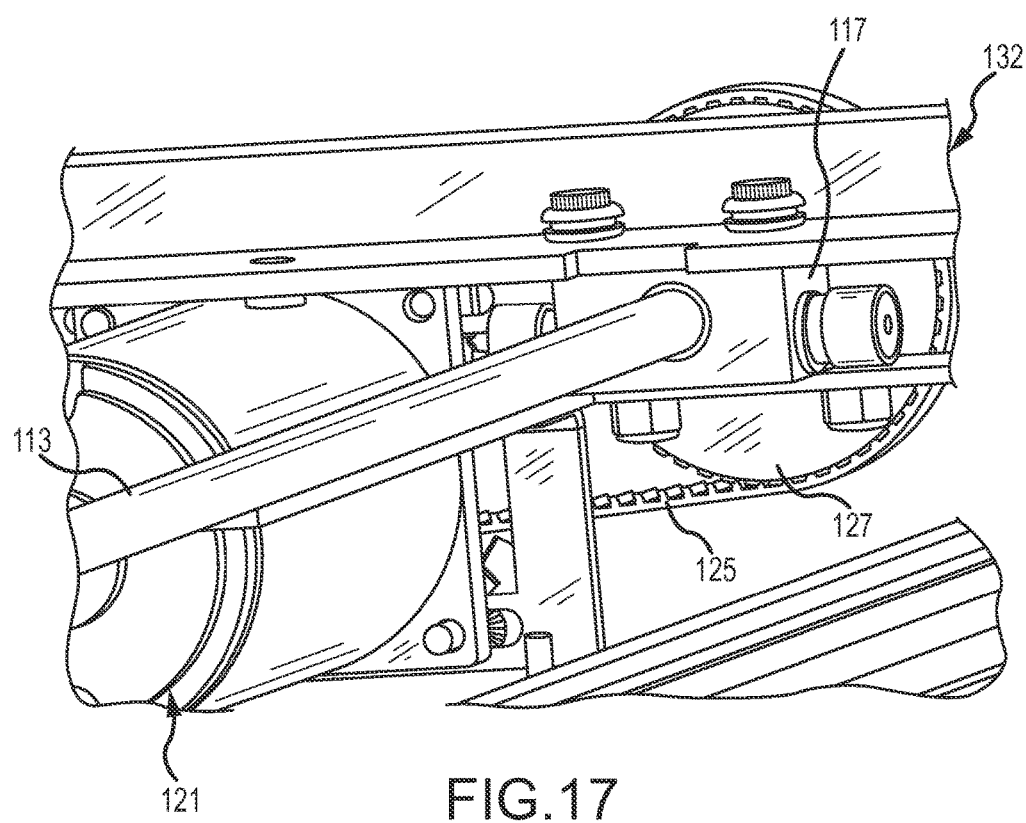
FIG. 17 is an enlarged perspective view of the drive system shown in FIG. 16 more clearly showing the arrangement of the lead screw, lead nut, and drive sprocket assembly.

As briefly mentioned above, another embodiment 110 of the vehicle ramp system according to the teachings provided herein may be provided with a drive system 111. Drive system 111 may be used to automatically extend and retract the ramp member 42. Referring now to FIGS. 16 and 17, drive system 111 may be configured to be received by base member 124, which may be identical to base member 24 already described for the first embodiment 10. Stated somewhat differently, the identical configurations of the base members 24 and 124 will allow the first embodiment 10, i.e., having manual ramp deployment, to be readily and easily converted into a powered vehicle ramp system 110.

More specifically, and as was described for the base frame 24 of the first embodiment 10, the base frame 124 of the second embodiment 110 may comprise a generally rectangularly-shaped planform or configuration and may be provided with a plurality of mounting tabs or lugs 172 to allow the base frame 124 to be secured to the floor section 12 or structural adapter assembly 16, as the case may be. As was the case for base frame 24, base frame 124 also may be provided with various other features or mounting points 174 to receive the various components of the drive system 111.

Base frame 124 may also include a pair of track members 126 and 128 that are mounted thereto in generally parallel, spaced-apart relation so that they extend along a longitudinal direction 130. A trolley assembly 132 having a plurality of guide wheels 134 mounted thereto is sized to engage the track members 126 and 128 so that trolley member 132 may be moved back and forth along the longitudinal direction 130. Base frame 124 may also be provided with a pair of support rollers 136 and 138 mounted in spaced-apart relation near an outboard end 140 of base frame 124.

It should be noted that all of these components, e.g., track members 126, 128, trolley assembly 132, guide wheels 134, and ramp support rollers 136, 138, may be substantially identical to the corresponding components in the first embodiment 10 already described. Accordingly, these components will not be described in further detail herein.

As mentioned above, drive system 111 is used to move the trolley assembly 132, thus an attached ramp member (not shown in FIG. 16 or 17), back and forth along the longitudinal direction 130 in order to move the ramp member between the retracted and extended positions in a manner similar to that already described for the first embodiment 10. Drive system 111 may comprise a lead screw 113 journalled for rotation in the base frame 124 by a pair of pillow block bearing assemblies 115 (only one of which is shown in FIGS. 16 and 17). A lead nut 117 mounted to trolley assembly 132 engages lead screw 113. Thus, lead nut 117 and trolley assembly 132 will move back and forth along the longitudinal direction 130 as the lead screw 113 is rotated in the clockwise and counter-clockwise directions, indicated by arrows 119.

Lead screw 113 may be rotated in the clockwise and counter-clockwise directions 119 by a drive motor 121 and transmission system 123. In the particular embodiment shown and described herein, transmission system 123 may comprise a belt drive system in which a toothed belt 125 connects a toothed motor pinion (not shown) mounted to a motor shaft (also not shown) and a toothed sprocket 127 mounted on lead screw 113. See FIG. 17. Alternatively, other types of drive motor and transmission systems could be used, as would become apparent to persons having ordinary skill in the art after having become familiar with the teachings provided herein.

Drive system 111 may also comprise various additional systems and devices, such a motor control system, position sensors, and/or limit switches (not shown), to operate the drive motor 121 to move the ramp between the retracted and extended positions. However, because such motor control systems and sensors are well-known in the art and could be readily provided by persons having ordinary skill in the art after having become familiar with the teachings provided herein, the particular motor control system and sensors that may be utilized in the various embodiments will not be described in further detail herein.

The second embodiment 110 of the vehicle ramp system (i.e., having a drive system 111), may be operated in a manner similar to the first embodiment 10 described earlier. In order to extend the ramp, a user would operate the drive system 111 (e.g., by actuating a switch) to extend the ramp. The motor control system (not shown) would then activate motor 121 to rotate the lead screw 113 in the appropriate direction to cause the ramp to move from the retracted position 18 (e.g., shown in FIGS. 2 and 3 for the first embodiment 10) to the extended position 20 (e.g., shown in FIG. 4 for the first embodiment 10). If desired, the user could grasp the handle assembly (e.g., 56) to assist in lowering the ramp to the ground, although this would not be required. Once the ramp is fully extended, a ramp position sensor or limit switch (not shown) would be activated to de-energize the motor 121 and terminate the extension process.

The ramp could be returned to the stowed position in a similar manner. That is, the user could activate the appropriate switch to cause the drive system 111 to return the ramp to the retracted or stowed position. During the retraction process, the motor 121 would rotate the lead screw 113 in the opposite direction to move the trolley assembly 132 back toward the retracted position. As the trolley assembly 132 moves toward the retracted position, the cooperative engagement of the ramp with the support rollers 136 and 138 would also lift the leading edge (e.g., leading edge 58) of the ramp as it is retracted into the vehicle.

Having herein set forth preferred embodiments of the present invention, it is anticipated that suitable modifications can be made thereto which will nonetheless remain within the scope of the invention. The invention shall therefore only be construed in accordance with the following claims:

The invention claimed is:

1. A ramp system for a vehicle, comprising:
   a base frame adapted to be mounted to the vehicle;
   a first elongate track member mounted to said base frame;
   a second elongate track member mounted to said base frame in generally parallel, spaced-apart relation to said first elongate track member, said first and second elongate track members extending generally along a longitudinal direction;
a trolley assembly mounted to said first and second elongate track members so that said trolley assembly is moveable along the longitudinal direction;
a ramp member pivotally mounted to said trolley assembly so that said ramp member is moveable between a retracted position and an extended position;
a support roller mounted to said base frame, said support roller contacting an underside of said ramp member;
a handle assembly mounted to said ramp member, said handle assembly comprising a generally elongate rod having a handle end and a lower end and a spring mounted to the lower end of said rod, said spring being mounted to said ramp member, said spring allowing said elongate rod to be articulated with respect to said ramp member, said handle assembly allowing a user to move said ramp member between the retracted and extended positions, a cooperative engagement of said ramp member with said trolley assembly and said support roller lowering a leading edge of said ramp member to a ground surface when said ramp member is being moved to the extended position, the cooperative engagement elevating the leading edge of said ramp member from the ground surface when said ramp member is moved toward the retracted position.

2. The ramp system of claim 1, wherein said first and second elongate track members allow said trolley assembly to move in the longitudinal direction while preventing said trolley assembly from moving in lateral and vertical directions, the lateral and vertical directions being orthogonal to the longitudinal direction.

3. The ramp system of claim 1, wherein said first and second elongate track members comprise a C-shaped cross-section and wherein said trolley assembly comprises at least first and second guide wheels sized to be received within the C-shaped cross-section of said first and second elongate track members, respectively.

4. The ramp system of claim 1, wherein said ramp comprises:
a core section;
an upper face member bonded to a first side of said core section; and
a lower face member bonded to a second side of said core section.

5. The ramp system of claim 4, wherein said core section comprises aluminum having a honeycomb configuration and wherein said upper and lower face members comprise aluminum.

6. The ramp system of claim 1, further comprising first and second elongate side rails mounted to said ramp member in generally parallel, spaced apart relation.

7. The ramp system of claim 6, further comprising a floor plate assembly mountable to a floor section of the vehicle, said floor plate assembly covering said ramp system and being substantially aligned with an existing vehicle floor.

8. The ramp system of claim 7, further comprising a transition plate pivotally mounted to said floor plate assembly, said transition plate closing a gap between said floor plate assembly and said ramp member when said ramp member is in the extended position.

9. The ramp system of claim 8, wherein each of said first and second elongate side rails comprises a leading end having a tapered profile and a trailing end having a curved profile.

10. The ramp system of claim 9, wherein said transition plate engages said first and second side rails, the tapered profiles of the leading ends of said first and second side rails lowering said transition plate toward said ramp member when said ramp member is in the retracted position, the curved profiles of the trailing ends of said first and second side rails lowering said transition plate toward said ramp member when said ramp member is in the extended position to close a gap between said ramp member and said floor plate assembly when said ramp member is in the extended position.

11. The ramp system of claim 6, further comprising:
a first safety rail pivotally mounted to said first side rail, said first safety rail being moveable between an extended position and a folded position; and
a second safety rail pivotally mounted to said second side rail, said second safety rail being moveable between an extended position and a folded position.

12. The ramp system of claim 11, further comprising:
a first actuating rod operatively attached to said first safety rail, said first actuating rod rotating said first safety rail to the folded position when the ramp is moved to the retracted position, said first actuating rod rotating the first safety rail to the extended position when the ramp is moved toward the extended position; and
a second actuating rod operatively attached to said second safety rail, said second actuating rod rotating said second safety rail to the folded position when the ramp is moved to the retracted position, said second actuating rod rotating the second safety rail to the extended position when the ramp is moved toward the extended position.

13. The ramp system of claim 1, further comprising a drive system operatively connected to said trolley assembly, said drive system moving said trolley assembly.

14. The ramp system of claim 13, wherein said drive system further comprises:
a lead screw mounted for rotation in said base frame, said lead screw extending along the longitudinal direction;
a lead nut mounted to said trolley assembly and operatively engaged with said lead screw; and
a motor operatively connected to said lead screw, said motor turning said lead screw to move said trolley assembly along the longitudinal direction.

15. The ramp system of claim 14, further comprising:
a sprocket mounted to said lead screw;
a drive pinion mounted to said motor; and
a drive belt operatively connected to said sprocket and said drive pinion.

16. A ramp system for a vehicle, comprising;
a base frame adapted to be mounted to the vehicle;
a first elongate track member mounted to said base frame;
a second elongate track member mounted to said base frame in generally parallel, spaced-apart relation to said first elongate track member, said first and second elongate track members extending generally along a longitudinal direction;
a trolley assembly mounted to said first and second elongate track members so that said trolley assembly is moveable along the longitudinal direction;
a ramp member pivotally mounted to said trolley assembly so that said ramp member is moveable between a retracted position and an extended position;
a first elongate side rail mounted to said ramp member, said first elongate side rail comprising a leading end having a tapered profile and a trailing end having a curved profile;

a second elongate side rail mounted to said ramp member in generally parallel, spaced-apart relation to said first elongate side rail, said second elongate side rail comprising a leading end having a tapered profile and a trailing end having a curved profile;

a support roller mounted to said base frame, said support roller contacting an underside of said ramp member;

a floor plate assembly mounted to a floor section of the vehicle, said floor plate assembly covering said ramp system and being substantially aligned with an existing vehicle floor;

a transition plate pivotally mounted to said floor plate assembly, wherein said transition plate engages said first and second side rails, the tapered profiles of the leading ends of said first and second side rails lowering said transition plate toward said ramp member when said ramp member is in the retracted position, the curved profiles of the trailing ends of said first and second side rails lowering said transition plate toward said ramp member when said ramp member is in the extended position to close a gap between said ramp member and said floor plate assembly when said ramp member is in the extended position;

a handle assembly mounted to said ramp member, said handle assembly allowing a user to move said ramp member between the retracted and extended positions, a cooperative engagement of said ramp member with said trolley assembly and said support roller lowering a leading edge of said ramp member to a ground surface when said ramp member is being moved to the extended position, the cooperative engagement elevating the leading edge of said ramp member from the ground surface when said ramp member is moved toward the retracted position.

17. The ramp system of claim 16, wherein said first and second elongate track members allow said trolley assembly to move in the longitudinal direction while preventing said trolley assembly from moving in lateral and vertical directions, the lateral and vertical directions being orthogonal to the longitudinal direction.

18. The ramp system of claim 16, further comprising:
a first safety rail pivotally mounted to said first side rail, said first safety rail being moveable between an extended position and a folded position; and
a second safety rail pivotally mounted to said second side rail, said second safety rail being moveable between an extended position and a folded position.

19. The ramp system of claim 18, further comprising:
a first actuating rod operatively attached to said first safety rail, said first actuating rod rotating said first safety rail to the folded position when the ramp is moved to the retracted position, said first actuating rod rotating the first safety rail to the extended position when the ramp is moved toward the extended position; and
a second actuating rod operatively attached to said second safety rail, said second actuating rod rotating said second safety rail to the folded position when the ramp is moved to the retracted position, said second actuating rod rotating the second safety rail to the extended position when the ramp is moved toward the extended position.

* * * * *